United States Patent [19]

Perricone et al.

[11] 4,283,517

[45] Aug. 11, 1981

[54] CONTINUOUS PROCESS FOR SOLUTION POLYMERIZATION OF ACRYLAMIDE

[75] Inventors: Alphonse C. Perricone; James M. Lucas, both of Houston, Tex.

[73] Assignee: Milchem Incorporated, Houston, Tex.

[21] Appl. No.: 57,918

[22] Filed: Jul. 16, 1979

[51] Int. Cl.³ .............................. C08F 2/00; C08F 4/30
[52] U.S. Cl. ...................................... 526/229; 526/73; 526/88; 526/287; 526/303; 526/920
[58] Field of Search ............... 526/287, 303, 317, 229

[56] References Cited

U.S. PATENT DOCUMENTS

| | | | |
|---|---|---|---|
| 3,058,958 | 10/1962 | Glavis | 526/317 X |
| 3,732,193 | 5/1973 | Svarz | 526/303 X |
| 3,923,756 | 12/1975 | Svarz | 526/303 X |
| 4,032,701 | 6/1977 | Hughes | 526/88 |
| 4,138,539 | 2/1979 | Landolt | 526/93 |

*Primary Examiner*—C. A. Henderson
*Attorney, Agent, or Firm*—William C. Norvell, Jr.

[57] ABSTRACT

A continuous process is provided for producing substantially homogeneous, non-tacky solid terpolymers of acrylamide, an alkali metal salt of acrylic acid and a hydroxyalkyl acrylate, and copolymers, optionally cross-linked, of a (meth)acrylamidoalkylsulfonic acid or alkali metal salt thereof and (meth)acrylamide or N-alkyl(meth)acrylamide, by rapidly heating a single phase high solids aqueous solution of the monomers to polymerization initiation temperature immediately prior to depositing a uniform layer of the solution and, at the same time, a solution of a polymerization initiator, onto a moving surface, the surface and the reaction mixture only being heated if necessary to keep the temperature of the polymerizing mixing from dropping substantially below the polymerization initiation temperature.

21 Claims, 1 Drawing Figure

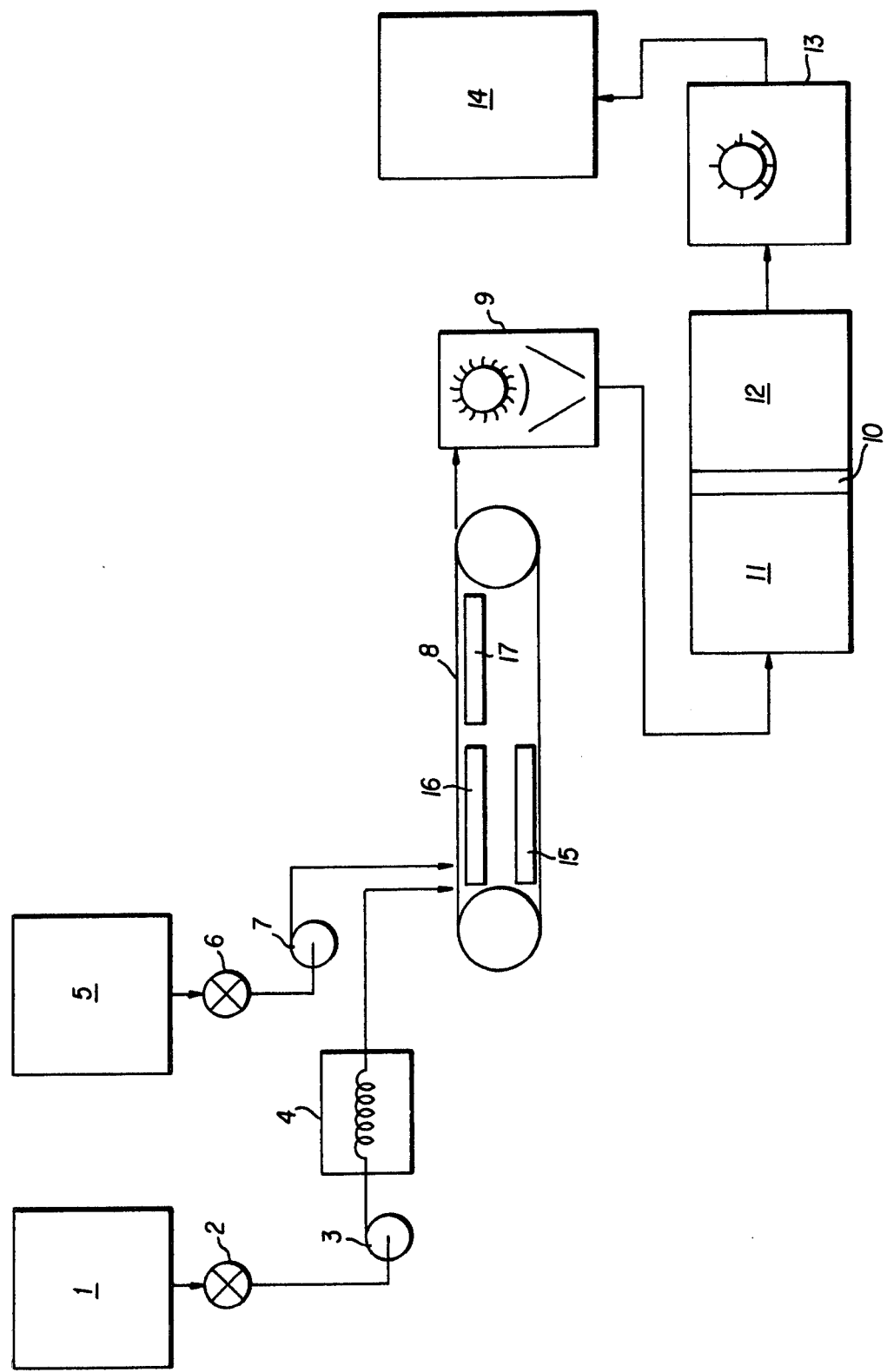

CONTINUOUS PROCESS FOR SOLUTION POLYMERIZATION OF ACRYLAMIDE

BACKGROUND OF THE INVENTION

This invention relates to a continuous process for producing substantially homogeneous solid, non-tacky polymers of low moisture content by solution polymerization of acrylamide-containing monomer mixtures.

Acrylamide copolymers have been produced by a variety of techniques. For example, emulsion, suspension, solution or bulk polymerization techniques may be used. The preferred technique is solution polymerization. This may be effected in a batch process or, more desirably, in a continuous process.

Copending commonly assigned applications entitled "Aqueous Drilling Fluid Additive, Composition and Process", Ser. No. 946,227, filed Sept. 27, 1978 and "Copolymer Filtration Control Agent", Ser. No. 19,219, filed Mar. 9, 1979, both now abandoned in favor of continuing applications, disclose that certain polymers containing (meth)acrylamide or N-alkyl(meth)acrylamide are particularly effective filtration control agents for utilization in aqueous drilling fluids. In particular, a terpolymer of an alkali metal salt of acrylic acid, a hydroxyalkyl acrylate and acrylamide is advantageously used, as is a copolymer of a (meth)acrylamidoalkylsulfonic acid or alkali metal salt thereof and (meth)acrylamide or N-alkyl(meth)acrylamide, this copolymer being optionally cross-linked with a quaternary ammonium salt cross-linking agent. The copending applications disclose only batch processes for making these polymers. The present invention is a continuous process for the solution polymerization of these monomer mixtures to form solid, non-tacky polymers of low moisture content which are suitable, optionally after drying and milling, for use as filtration control agents in aqueous drilling fluids.

U.S. Pat. Nos. 3,663,518 and 3,732,193 disclose continuous processes wherein preformed solutions of acrylamide monomer mixtures and polymerization initiators are deposited on a moving belt and then heated to initiation temperature, after which they are passed into a polymerization zone. The process of U.S. Pat. No. 3,732,193 employs an inert gas atmosphere in the reaction zone.

U.S. Pat. No. 4,032,701 discloses a continuous process for producing a dry, solid polyacrylamide, wherein a concentrated aqueous solution of acrylamide monomer is heated to produce a single phase solution, and this solution is deposited, together with a separately prepared solution of initiator, on a heated rotating metal disc. The heated disc serves to further raise the temperature of the acrylamide/initiator mixture to a suitable initiation temperature, after which exothermic polymerization occurs to form a dry polymer.

These methods all require heating a mixture of monomers and initiator, after deposition on the moving surface, to reach the polymerization initiation temperature.

According to the method of U.S. Pat. Nos. 3,663,518 and 3,732,193, the initiator is added to the monomer solution at a relatively low temperature in the monomer tank. The mixture of monomer and initiator is then deposited on a moving surface and heated to the polymerization temperature on the moving surface. This is not entirely satisfactory for the commercial production of the polymers of this invention because either heat must be applied at such a high rate that very uneven heating occurs, with charring at the heated surface and some thermally initiated polymerization competing with free radical-initiated polymerization, or impractically long distances and/or thin reaction mixture films must be used, which increases equipment and production costs to an economically unacceptable level.

In the process of U.S. Pat. No. 4,032,701, the monomers would be heated in the monomer tank to 50°-100° C. This causes thermally initiated polymerization in the tank, at rates differing from the rates of free radical-initiated polymerization, which results in substantially non-uniform product and causes polymer buildup on the equipment. Competing thermally initiated and free radical-initiated polymerization is not a problem in the production of acrylamide homopolymer, which is the product made in U.S. Pat. No. 4,032,701, but would be a problem with applicant's monomer mixtures. This reference teaches heating the monomer solution until a single phase solution is achieved. In the case of the monomers used in the present invention, this temperature is about 30° C., rather than about 50° C. as in U.S. Pat. No. 4,032,701. Using the heated metal disc to raise the temperature of the mixture of monomers and initiator from about 30° C. to about 70° C., following the procedure of U.S. Pat. No. 4,032,701, would require either inordinately high temperatures for the disc, causing charring and very uneven heating, or an impractically large disc and thin reaction mixture film, again making this alternative economically unacceptable for commercial use.

Precise control of product composition, homogeneity and moisture content is not possible using the prior art continuous processes.

OBJECTS OF THE INVENTION

One object of the present invention is to provide a continuous process for producing substantially homogeneous solid copolymers and terpolymers of acrylamide of low moisture content by solution polymerization.

Another object of the invention is to provide such a continuous process for producing such acrylamide copolymers and terpolymers with commercially acceptable equipment and at low production costs.

Yet another object of the present invention is to provide a continuous process for the production of acrylamide copolymers and terpolymers suitable for use as filtration control agents in aqueous drilling fluids.

Upon further study of the specification and appended claims, further objects and advantages of this invention will become apparent to those skilled in the art.

SUMMARY OF THE INVENTION

Briefly, these and other objects of the invention may be achieved by providing a continuous polymerization process for producing a continuous, substantially homogeneous stream of a solid, non-tacky polymer, which comprises the steps of:

(a) forming a concentrated aqueous monomer solution at a temperature sufficient to form a single phase solution but insufficient to cause substantial thermally initiated polymerization of the monomer solution; said monomers being (i) a mixture consisting essentially of an alkali metal salt of acrylic acid, a hydroxyalkyl acrylate and acrylamide, in proportions of from 5 to 62 mole%, from 2.1 to 40 mole% and from 31 to 91 mole%, respectively; or (ii) a mixture consisting essentially of (a) a (meth)acrylamidoalkylsulfonic acid or alkali metal salt thereof and (b) (meth)acrylamide or N-alkyl(meth)acrylamide, in proportions of from 8 to 70 mole% and from 30 to 92 mole%, respectively, or (iii) mixture (ii), further containing from 0.2 to 4.4 mole% of a quaternary ammonium salt cross-linking agent;

(b) heating a continuous stream of the monomer solution of step (a) to a desired polymerization initiation temperature, at a rate sufficient to reach the polymerization initiation temperature before substantial thermally initiated polymerization occurs;

(c) immediately and continuously thereafter depositing the heated stream of monomer solution as a continuous, substantially uniform layer on a moving surface;

(d) substantially simultaneously with step (c), continuously and substantially uniformly applying to the moving surface a catalytically effective amount of a polymerization initiator for the monomers, thereby continuously forming a substantially uniform moving surface, the moving surface and the reaction mixture being unheated or heated only sufficiently to keep the temperature of the polymerizing mixture on the moving surface from falling substantially below the polymerization initiation temperature until polymerization is substantially complete, whereby the monomers exothermically and substantially homogeneously polymerize and a portion of the water therein evaporates to form a continuous stream of a substantially homogeneous solid non-tacky polymer; and (e) recovering the resultant solid, non-tacky polymer.

BRIEF DESCRIPTION OF THE DRAWING

FIG. 1 is a schematic flow diagram of the process of the invention.

DESCRIPTION OF THE PREFERRED EMBODIMENTS

According to the process of the present invention, a solution of monomers is prepared and held at a temperature high enough to form a single phase system, but not sufficiently high as to initiate appreciable thermal polymerization in the monomer feed tank, e.g., up to about 80° C. At temperatures much above 80° C., thermally initiated polymerization can occur to a substantial degree, and this has undesirable consequences. On the one hand, a skin of polymer tends to form on the inner sufaces of the heat exchanger tubes, thereby reducing their efficiency. Blockages can occur both in the heat exchanger and in the feed tube to the moving surface. Furthermore, since thermally initiated polymerization and radical initiated polymerization occur at different rates, it is difficult to control the molecular weight and the resultant properties of a polymer which has undergone substantial thermal polymerization prior to a later phase of radical initiated polymerization.

It has also been found that supplying a monomer feed solution at a temperature substantially below the polymerization initiation temperature to the moving surface, combining it with initiator, and then heating the mixture to the polymer initiation temperature has disadvantages as well. Since a single phase monomers solution can be prepared at temperatures of 40° C. and lower, with a preferred temperature for the monomer feed solution being about 30° C., it would be necessary to raise the temperature by about 30°–40° C. on the moving surface before the optimal polymerization initiation temperature is reached. Unless heating is achieved relatively quickly, an inordinately large surface would be required. In order to achieve the same rise in temperature which is achieved by means of a heat exchanger in a time-span of about one-half minute or less, using the same monomer mixtures and layer thicknesses used in the process of the present invention, a surface temperature between about 173° C. and about 240° C. would be required. Polytetrafluoroethylene coated fabric belts or a similar surface would be damaged at temperatures above 100° C., so metal surfaces or belts would be needed, and product removal will be complicated due to adherence of the polymers to the metal surface. Furthermore, at such high temperatures, quite uneven polymerization will occur, since the monomers in contact with the hot surface will be polymerized primarily by thermal initiation, while monomers near the surface of the liquid will be polymerized primarily by radical initiation. Substantially inhomogeneous polymerization will occur, and the resultant polymer will have a substantially wider molecular weight range.

The process of the present invention avoids the aforementioned difficulties by rapidly heating only a portion of the monomer feed solution, as a continuous stream, and adding initiator to the heated monomer solution at the polymerization initiation temperature, as it is being deposited on a moving surface. The residence time of the monomer solution in the heating means, which advantageously is a heat exchanger maintained at a constant temperature, is kept to about one-half minute or less, preferably about 0.3 minute. Longer residence times lead to polymer build-up in the heat exchanger tubes and to appreciable thermal polymerization of the monomer feed. Of course, addition of polymerization initiator to the monomer feed prior to passage through the heat exchanger leads to polymerization within the heat exchanger, causing the polymer to build up and clog the heat exchanger.

The process of the invention may be used to produce a terpolymer of an alkali metal salt of acrylic acid, a hydroxyalkyl acrylate and acrylamide.

Any alkali metal salt of acrylic acid may be used as a starting monomer for preparation of this terpolymer, the sodium salt being preferred. The proportion of the alkali metal salt of acrylic acid in the monomer feed may range from 5 mole% to 62 mole%. It is preferable to use the sodium salt of acrylic acid, in a proportion of about 16 mole% to about 27 mole% of sodium acrylate.

The hydroxyalkyl acrylate component of the terpolymer is typically a 2-hydroxyalkyl acrylate or a 3-hydroxyalkyl acrylate, such as 2-hydroxyethyl acrylate, 2-hydroxybutyl acrylate, or preferably, 2-hydroxypropyl acrylate (HPA). The selected hydroxyalkyl acrylate is present in the monomer solution in a proportion of from about 2.1 mole% to about 40 mole%. Preferably, 2-hydroxypropyl acrylate is used, in a proportion of from about 3.6 mole% to about 4.0 mole%.

Acrylamide is present in the monomer solution for producing the terpolymer in a proportion of from 31 mole% to 91 mole%, and preferably from about 70 mole% to about 80 mole%.

The alkali metal salt of acrylic acid may be prepared in situ by adding acrylic acid to the corresponding alkali metal hydroxide, taking care that the temperature does not exceed about 40° C. It is desirable to add the hydroxylalkyl acrylate last, just prior to start-up, to a monomers solution which is at about 30° C.

The total monomers concentration is normally from 65 to 75 weight% because it is advantageous to use solution which are as concentrated as possible, since this facilitates eventual production of a low moisture content product. Lower concentrations merely increase the heat energy required to produce a non-tacky solid product and slows down the reaction at the lower concentrations, e.g., about 55% or lower, are not suitable for continuous production.

The pH of the monomers solution is advantageously adjusted to about 5.6–6.7, preferably about 6.2.

The monomer feed for producing the terpolymer is desirably held at a temperature from about 23 to about 40° C. in the monomer feed tank, preferably about 30° C. The polymer initiation temperature for production of the terpolymer is desirably between about 60° and 80° C., preferably about 70° C. The polymerizing mixing on the surface should be maintained at at least this temperature, using radiant heat or other conventional means.

External heat is only added if necessary to prevent the temperature of the mixture on the belt or other surface from dropping substantially below the polymerization temperature. Generally, the temperature will spontaneously rise somewhat above the polymerization initiation temperature during the latter stages of polymerization due to the exothermic nature of the reaction. This causes some of the water to vaporize, which moderates the temperature. The steam also acts as a blowing agent, producing a foamed polymer product.

The polymerization may be promoted by typical initiators used in aqueous systems such as peroxides, persulfates, persulfate-sulfites, various redox systems, and the like. It has been found that the terpolymer can be made with small quantities of initiator when polymerization is carried out at an initiation temperature within the aforementioned range. The amount of initiator under such conditions does not substantially affect the properties of the terpolymer, for example, in its use as a filtration control agent.

A preferred initiator solution may be prepared by dissolving from about 2% to 3%, by weight, $K_2S_2O_8$ in water, preferably from 2.7 to 2.85 weight%. Generally, the volume ratio of monomer feed to initiator feed added to the belt should be between about 15:1 and about 18:1, preferably between 16-½:1 and 17-½:1.

The terpolymer produced as described above normally has a moisture content of less than 18%, and usually less than 15%, e.g., from 18% to 15%. At such moisture levels, the product is non-tacky and readily processable into its desired final form.

It has been found advantageous to dry the terpolymer for use as a filtration control agent. Drying is advantageously effected at a temperature between about 100° C. and about 150° C. for a time of from about 4 and 1 hours, preferably from about 130° C. to 150° C. for from about 1-½ to 1 hours. A particularly effective method is to dry the product for about one hour at about 150° C. in an atmosphere oven.

The dried product is conveniently ground and milled, for example, sufficient to pass through a 30 mesh screen, prior to use. Preferably, the dry product is stored in a moisture-proof container.

The second type of polymer which is prepared by the process of the present invention is a copolymer of (meth)acrylamidoalkylsulfonic acid and alkali metal salt thereof and (meth)acrylamide or N-alkyl(meth)acrylamide. This copolymer may be prepared in cross-linked form by incorporating a quaternary ammonium salt cross-linking agent in the monomers solution.

Any (alkali metal salt of) acrylamidoalkylsulfonic acid may be used as a starting monomer for preparation of this copolymer, the sodium salt being preferred. Suitable such monomers include, but are not limited to, 2-acrylamidopropylsulfonic acid, 3-acrylamidopropylsulfonic acid, or the sodium salts thereof, preferably, sodium 2-acrylamido-2-methylpropanesulfonate. The proportion of (alkali metal salt of) acrylamidoalkylsulfonic acid may range from about 9 mole% to about 70 mole%, preferably from about 9 mole% to about 20 mole%.

Any (meth)acrylamide or N-alkyl(meth)acrylamide which is capable of copolymerization with the acrylamidoalkylsulfonic acid or alkali metal salt thereof may be used as the comonomer in the process of the invention. Acrylamide has the advantage of comparatively low cost, ready availability and ease of reaction with other reagents. Hence, it is the preferred comonomer for industrial uses. This comonomer may be used in a proportion of from 30 mole% to 91 mole%, preferably from about 70 mole% to about 90 mole%.

Under some circumstances, it may be desirable to provide the copolymer in a cross-linked form. In the preparation of cross-linked copolymer, the quanternary ammonium salt cross-linking agent is advantageously selected from salts which include, but are not limited to, 3-methacryloyloxy-2-hydroxypropyltrimethylammonium chloride, 3-acrylamido-3-methylbutyltrimethylammonium chloride, diallyldimethylammonium chloride, N-methyl-2-vinylpyridinium methyl sulfate, N-methyl-4-vinylpyridinium methyl sulfate, N-propylacrylamidotrimethylammonium chloride, or, preferably, 2-methacryloyloxyethyltrimemthylammonium methanesulfonate. An amount of (meth)acryloyloxyalkyltrimethylammonium salt from 0.2 mole% to 4.4 mole% may be utilized, preferably from 0.2 mole% to 0.5 mole% methacryloyloxyethyltrimethylammonium methanesulfonate.

In the preparation of a cross-linked copolymer, (meth)acrylamidoalkylsulfonic acid or alkali metal salt thereof is advantageously used in the proportion of from 8 mole% to 70 mole%, preferably from 9.8 mole% to 20 mole%. The (meth)acrylamide or N-alkyl(meth)acrylamide is advantageously used in a proportion of from 30 mole% to 92 mole%, preferably from 78 mole% to 90 mole%.

It should again be noted that the alkali metal salt of the (meth)acrylamidoalkylsulfonic acid may be prepared in situ by adding the acid to the corresponding alkali metal hydroxide.

The total monomers concentration for preparing these copolymers also is normally from 65 to 75 weight%.

The pH of the monomers solution is advantageously adjusted to 6.6–8.0, preferably about 7.0. A pH too far in the acid range will initiate polymerization of the (meth)acrylamidoalkylsulfonic acid.

The polymerization may be promoted by typical polymer initiators used in aqueous systems, such as those described above for the terpolymer. The initiator may be used in comparable concentrations and ratios as above described.

The monomer feed for producing the copolymer is desirably held at a temperature from about 23° to about 40° C. in the monomer feed tank, preferably about 30° C. The polymer initiation temperature for production of the copolymer is desirably between 55° and 65° C., preferably about 60° C. The polymerizing mixture on the belt or other surface normally maintains at least this initiation temperature without the use of external heating, although heat may be applied if necessary. Again, some foaming action occurs in the course of polymerization.

The copolymer may be dried and/or milled prior to use. However, since this copolymer is non-tacky and normally contains relatively low amounts of moisture, typically between 10 to 20% by weight, it is often suitable for use without further drying.

The process of the invention may be more fully understood by means of the following description, and in reference to the drawing. As illustrated in FIG. 1, the monomers are normally mixed in a vessel 1 which is advantageously equipped with a stirring means, a thermometer, and means for heating and cooling the contents. The monomers are fed, by means of a valve 2 and a pump 3, to a heat exchange means 4, for example, a metal coil of suitable diameter which is immersed in a regulated constant termperature bath. The pump transfers liquid from the monomers feed tank through the heat exchanger at a controllable rate to achieve an exit temperature from the heat exchanger which is the desired polymerization initiation temperature. The heated monomer solution is then immediately fed to the belt 8 or other surface.

The initiator solution is separately prepared in a suitable vessel 5. Simultaneously with the deposition of the monomer solution, a suitable quantity of initiator solution is fed to the belt through the valve 6 and the pump 7. These streams mix as they fall onto the belt and achieve substantial homogeneity as or shortly after they are deposited on the belt or other surface.

It is normally desirable to deposit a layer of monomer and initiator mixture having an average thickness at the center of the belt or other surface of between 1.6 and 0.6 cm, preferably from 1.3 to 1.0 cm. The polymerized product is a foam which is thicker than the original layer of monomer and initiator mixture and typically is about 2.0 to 2.5 cm. thick.

The belt 8 itself may be a continuous length of a suitable material which preferably has a surface to which the polymer does not adhere, e.g., polytetrafluoroethylene-coated fabric, driven by suitable drive means. The belt must be long enough to permit substantially complete polymerization to occur before the reaction mixture reaches the end of the reaction zone. The production rate can be varied by varying the size of the belt or other surface and the cycle length of the surface. It is advantageous to make the belt surface concave by addition of rails to the edges of the belt channel. This gives the belt a saucer-shaped cross-section, which is well suited to containing a relatively even layer of polymerizing mixture.

As shown in FIG. 1, the belt may be heated by contact with a heated surface 16 to maintain the reaction temperature, if necessary. Only sufficient heat is used to keep the temperature of the reaction mixture from falling substantially below the polymerization initiation temperature.

Alternatively, heat lamps or other sources of radiant energy may be used for additional heat. These may be mounted in a hood above the belt at a suitable distance above the surface thereof. Heated air can also be used to offset the heat loss produced by the evaporation of the water.

It is often desirable to cool and comminute the non-tacky product. This may be effected by cooling the belt, after it has traveled a sufficient distance from the point of deposition for polymerization to be substantially complete, by contact with a cooled surface 17. The cooled polymer becomes brittle and is easier to remove from the belt or other surface. It is desirable to reheat the belt to about the polymerization initiation temperature using another heater 15 to compensate for any cooling it may undergo, especially that which is effected by the cooled surface 17. The product is then desirably cut into chunks, e.g., in a chopper 9. Alternatively, this may be effected by transferring the product from the reaction belt through a cold air stream and through a chopper to a product collector.

In addition, drying and/or milling may be desirable for particular uses.

The chopped product may be dried in a conventional drier 10 and further comminuted in a grinder 13. The terpolymer, when made by the present process, is advantageously dried in two stages. The drier then desirably consists of two portions 11 and 12. The first portion 11 operates at a higher temperature, which promotes a further curing of the product, while the second portion 12 cools the product to a suitable temperature for grinding. The ground product may be stored and/or packaged using suitable conventional storage/packaging means 14.

It will be apparent that various modifications of the general process may be used to achieve substantially the same result and such modifications are contemplated equivalents of the process of this invention. For example, the cross-linking agent may be applied to the belt as a separate solution concurrently with the heated comonomers and the initiator solutions at the time these are deposited on the moving belt. This permits production of either cross-linked or uncross-linked copolymer using the same monomer feed. Alternatively, separate monomer solutions may be heated and combined in the proper proportions just prior to or during their application onto the moving belt or other surface. Any variant which achieves the result of depositing a substantially homogeneous solution of initiator and monomers at a desired polymerization initiation temperature on the moving belt is within the scope of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

In the following examples, the monomers were prepared in 15 gallon stainless steel vessels equipped with a shut-off cock located on the bottom, a mechanical stirrer, a thermometer, and heating and cooling means. The initiator feed vessel was a 2-liter round bottomed flask, equipped with a stopcock on the bottom. The reaction system was a continuous 98 inch long by 6 inch wide polytetrafluoroethylene-coated belt, driven by a link chain and gear motor through a hood. The belt was fixed between two rollers, mounted on bearings in a fixed frame. The frame was 40 inches long by 7 inches wide and has a 4 inch deep 3/32 inch stainless steel channel formed into a "M" shape, with a "v" of about ½ inch depth. The belt was made concave by addition of two wooden rails attached to the belt channel. The belt was driven by a variable speed motor, with a speed that could be varied from about 9 inches per minute to about 30 inches per minute.

Three 250 watt heat lamps were mounted in the hood over the belt so that they were about 4.5 inches above the surface of the belt, and were used if additional heat was required to maintain the temperature of the polymerization mixture. The heat exchanger was about 10 foot by ¼ inch stainless steel coil immersed in a constant temperature bath.

The monomers feed from the heat exchanger and the initiator feed were added together onto the reaction surface by combining the two streams of liquid at about 1 to 2 inches above the reaction surface. The streams were mixed as they fell and spread by gravity on the reaction surface.

The product was cooled and chopped into pieces, and optionally dried. The product was then milled to pass through a 30 mesh screen, and stored in a moisture proof container.

EXAMPLE 1

Terpolymer of acrylamide, sodium acrylate and 2-hydroxypropyl acrylate.

The pump was set at a rate of 265 g of monomers feed per minute and the belt speed at about 17 inches per minute. The heat exchanger temperature was 78° C., and the exit temperature of the monomer solution was 70° C. The solution on the belt was maintained at about 68° to 70° C. by two 250 watt heat lamps. An effervescent reaction occurred within 1-½ minutes after the two feeds were mixed or at about 26 inches from the point of addition.

The product was dried for 1 hour at 150° C. in an atmosphere oven. A sample was weighed before and after drying and the weight loss was calculated. The product was ground and milled to pass through a 30 mesh screen.

Approximately 3832 lbs. of the polymer using Procedure B formulation were prepared.

The product from the belt contained about 14 wt% moisture that was removed after drying for 1 hour at 150° C. The yield of dry product was 3295 pounds. The rate of manufacturing was about 180 pounds per day.

EXAMPLE 2

Copolymer of acrylamide, sodium 2-acrylamido-2-methylpropanesulfonate (AMPS-Na) cross-linked with methacryloyloxyethyltrimethylammonium methanesulfonate (Sipomer Q 5-80K).

The monomers feed tank was charged with water and 50% caustic soda. The solution was stirred and cooled and the temperature kept at a maximum of 30° C. as the AMPS was added. After the AMPS had been added, all the acrylamide was added rapidly. The solution was heated to about 30° C. and the pH was adjusted to 7.0. When all the solids were dissolved, the requred amount of Sipomer Q5-80K was added. The quantities of reagents are the following:

|  | Wt,lb | Wt % |
|---|---|---|
| 50 wt % Caustic Soda | 7.94 | 6.56 |
| Water | 26.81 | 22.14 |
| Acrylamide | 64.94 | 53.63 |
| AMPS | 20.56 | 16.98 |
| Sipomer Q5-80K | 0.84 | 0.69 |
| Total | 121.09 |  |

The initiator solution was prepared by dissolving 97.8 g of $K_2S_2O_8$ in 7.19 lbs of water or 2.90 wt% $K_2S_2O_8$ in water.

The ratio of monomers feed to initiator feed added to the belt was about 16.7. The pumping rate of the monomers feed averaged about 336 g/minute. The belt speed was about 12 inches/minute. An effervescent reaction occurred about 24 to 28 in. from the point of injection of the feeds upon the belt. The monomers feed was pumped through a 60° C. heat exchanger and exited from the exchanger at about 60° C. No heat lamps were required to maintain the reaction temperature at 58°–60° C. Approximately 3536 pounds of the product were manufactured at the rate of about 200 pounds per day.

EXAMPLE 3

Copolymer of acrylamide and AMPS-Na, uncross-linked.

The procedure of Example 2 was repeated, except that the cross-linking agent was not added. Substantially the same results were obtained, except that an uncross-linked product was produced.

The polymers produced in Examples 1 and 2 were effective as filtration control agents when incorporated into aqueous drilling fluids.

The preceding examples can be repeated with similar success by substituting the generically or specifically described reactants and/or operating conditions of this invention for those used in the preceding examples.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A continuous polymerization process for producing a continuous, substantially homogeneous stream of a solid, non-tacky polymer which comprises the steps of:
    (a) forming a concentrated aqueous monomer solution at a temperature of from 23° to 40° C. to form a single phase solution said monomers being:
        (i) a mixture consisting essentially of an alkali metal salt of acrylic acid, a hydroxyalkyl acrylate and acrylamide, in proportions of from 5 to 62 mole%, from 2.1 to 40 mole% and from 31 to 91 mole%, respectively; or
        (ii) a mixture consisting essentially of (a) a (meth)acrylamidoalkylsulfonic acid or alkali metal salt thereof and (b) (meth)acrylamide or N-alkyl(-meth)acrylamide, in proportions of from 8 to 70 mole% and from 30 to 92 mole %, respectively; or (iii) mixture (ii), further containing from 0.2 to 4.4 moles of a quaternary ammonium salt cross-linking agent;

(b) heating a continuous stream of the monomer solution of step (a) to a polymerization initiation temperature of from 60° to 80° C. for mixture (i) or from 55° to 65° C. for mixture (ii) or (iii), by passage through an indirect heat exchanger at a rate such that the residence time of the solution in the heat exchanger is not longer than 0.5 minute;

(c) immediately and continuously thereafter depositing the heated stream of monomer solution as a continuous, substantially uniform layer on a moving surface;

(d) substantially simultaneously with step (c), continuously and substantially uniformly applying to the moving surface of catalytically effective amount of an aqueous solution of a polymerization initiator for the monomers, thereby continuously forming a substantially uniform reaction mixture of the heated monomer solution and the initiator on the moving surface said moving surface and said reaction mixture being unheated or heated only sufficiently to keep the temperature of the polymerizing mixture on the moving surface from falling substantially below said polymerization initiation temperature until polymerization is substantially complete; whereby the monomers exothermically and substantially homogeneously polymerize and a portion of the water therein evaporates to form a continuous stream of a substantially homogeneous solid, non-tacky polymer; and (e) recovering the resultant solid, non-tacky polymer.

2. The process of claim 1, wherein the moisture content of the resultant polymer is less than about 12% by weight.

3. The process of claim 1, wherein the temperature in step (a) is about 30° C.

4. The process of claim 1, wherein in step (b) said residence time is not longer than 0.3 minute.

5. The process of claim 1, wherein the aqueous monomer solution is solution (i).

6. The process of claim 5, wherein the monomers are sodium acrylate, 2-hydroxypropyl acrylate and acrylamide, in proportions of 16–27 mole%, 3–5 mole% and 70–80 mole%, respectively.

7. The process of claim 6, wherein the monomer solution is heated in step (b) to about 70° C.

8. The process of claim 7, wherein the polymerization initiator is potassium persulfate.

9. The process of claim 8, which further comprises the step of drying the solid polymer produced in step (e) for about 1 hour at about 150° C., and milling the dried polymer.

10. The process of claim 8, wherein in step (b) the stream of monomer solution is heated to 70° C. within 0.3 minute by passage through an indirect heat exchanger maintained at 78° C.; and in step (d) the polymerizing mixture is heated to maintain the temperature.

11. The process of claim 1, wherein the aqueous monomer solution is solution (ii).

12. The process of claim 11, wherein the monomers are 2-acrylamido-2-methylpropanesulfonic acid or the sodium salt thereof, and acrylamide, in proportions of about 20–10 mole% and about 80–90 mole%, respectively.

13. The process of claim 12, wherein the monomer solution is heated in step (b) to about 60° C. and wherein no heat is applied to the polymerizing mixture on the moving belt.

14. The process of claim 13, wherein the polymerization initiator is potassium persulfate.

15. The process of claim 14, wherein in step (b) the stream of monomer solution is heated to 60° C. within about 0.3 minute by passage through an indirect heat exchanger maintained at 60° C.

16. The process of claim 1, wherein the aqueous monomer solution is solution (iii).

17. The process of claim 16, wherein the monomers are 2-acrylamido-2-methylpropanesulfonic acid or the sodium salt thereof, and acrylamide, and the cross-linking agent is methacryloyloxyethyltrimethylamnmonium methanesulfonate, in proportions of about 20–9 mole%, about 80–90 mole% and about 4–2 mole%, respectively.

18. The process of claim 17, wherein the monomer solution is heated in step (b) to about 60° C., and wherein no heat is applied to the polymerizing mixture on the moving surface.

19. The process of claim 18, wherein the polymerization initiator is potassium persulfate.

20. The process of claim 19, wherein in step (b) the stream of monomer solution is heated to 60° C. within about 0.3 minute by passage through an indirect heat exchanger maintained at 60° C.

21. The process of claim 1, wherein in step (b), the heated monomer solution is deposited on the surface as a layer having an average thickness of about one to two cm.

* * * * *